United States Patent
Yang et al.

(10) Patent No.: US 10,953,494 B2
(45) Date of Patent: *Mar. 23, 2021

(54) REMOTE LASER WELDING OF OVERLAPPING METAL WORKPIECES AT FAST SPEEDS

(71) Applicant: GM GLOBAL TECHNOLOGY OPERATIONS LLC, Detroit, MI (US)

(72) Inventors: David Yang, Shanghai (CN); Wu Tao, Tianmen (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 284 days.

This patent is subject to a terminal disclaimer.

(21) Appl. No.: 16/073,536

(22) PCT Filed: Mar. 16, 2016

(86) PCT No.: PCT/CN2016/076457
§ 371 (c)(1),
(2) Date: Jul. 27, 2018

(87) PCT Pub. No.: WO2017/156723
PCT Pub. Date: Sep. 21, 2017

(65) Prior Publication Data
US 2019/0061056 A1 Feb. 28, 2019

(51) Int. Cl.
*B23K 26/24* (2014.01)
*B23K 26/244* (2014.01)
(Continued)

(52) U.S. Cl.
CPC ........ *B23K 26/244* (2015.10); *B23K 26/0006* (2013.01); *B23K 26/073* (2013.01);
(Continued)

(58) Field of Classification Search
CPC ............... B23K 26/244; B23K 26/082; B23K 26/0006; B23K 26/073; B23K 26/0732;
(Continued)

(56) References Cited

U.S. PATENT DOCUMENTS 4,873,415 A * 10/1989 Johnson ............... B23K 26/24
219/121.64
5,183,992 A 2/1993 Bilge et al.
(Continued)

FOREIGN PATENT DOCUMENTS

CN 1532022 A 9/2004
CN 102089114 A 6/2011
(Continued)

OTHER PUBLICATIONS

International Search Report and Written Opinion for application No. PCT/CN2016/076457 dated Nov. 29, 2016; 12 pages.
(Continued)

*Primary Examiner* — Brian W Jennison
(74) *Attorney, Agent, or Firm* — Harness, Dickey & Pierce, P.L.C.

(57) ABSTRACT

A method of laser welding a workpiece stack-up (10) that includes at least two overlapping metal workpieces (12, 14) comprises advancing a laser beam (24) relative to a plane of a top surface (20) of the workpiece stack-up (10) from a start point (84) to an end point (86) along a beam travel pattern (78) at a high laser beam travel speed of greater than 8 meters per minute. The two or more overlapping metal workpieces (12, 14) may be steel workpieces or they may be aluminum workpieces, and at least one of the metal workpieces (12, 14) includes a surface coating (40). Advancing the laser beam (24) along the beam travel pattern (78) forms a weld joint (76), which includes resolidified composite workpiece material derived from each of the metal work- (Continued)

pieces (12, 14) penetrated by a molten weld pool (80), that fusion welds the metal workpieces (12, 14) together. The relatively high laser beam travel speed contributes to improve strength properties of the weld joint (76).

18 Claims, 5 Drawing Sheets

(51) Int. Cl.
  *B23K 26/073* (2006.01)
  *B23K 26/22* (2006.01)
  *B23K 26/322* (2014.01)
  *B23K 26/082* (2014.01)
  *B23K 26/00* (2014.01)
  B23K 101/00 (2006.01)
  B23K 101/18 (2006.01)
  B23K 101/34 (2006.01)
  B23K 103/04 (2006.01)
  B23K 103/10 (2006.01)
  B23K 103/18 (2006.01)

(52) U.S. Cl.
  CPC ...... *B23K 26/0732* (2013.01); *B23K 26/0736* (2013.01); *B23K 26/082* (2015.10); *B23K 26/22* (2013.01); *B23K 26/322* (2013.01); B23K 2101/006 (2018.08); B23K 2101/18 (2018.08); B23K 2101/34 (2018.08); B23K 2103/04 (2018.08); B23K 2103/10 (2018.08); B23K 2103/18 (2018.08)

(58) Field of Classification Search
  CPC .. B23K 26/0736; B23K 26/22; B23K 26/322; B23K 2103/18; B23K 2103/10; B23K 2101/18; B23K 2103/04; B23K 2101/34; B23K 2101/006
  See application file for complete search history.

(56) References Cited

U.S. PATENT DOCUMENTS

| | | | |
|---|---|---|---|
| 6,906,281 | B2 | 6/2005 | Musselman |
| 8,575,512 | B2 | 11/2013 | Hagihara et al. |
| 8,692,152 | B2 | 4/2014 | Katayama et al. |
| 10,195,689 | B2 * | 2/2019 | Yang .................... B23K 26/322 |
| 2004/0173587 | A1 * | 9/2004 | Musselman ........ B23K 26/0093 219/121.64 |
| 2006/0011592 | A1 * | 1/2006 | Wang .................... B23K 26/123 219/121.64 |
| 2009/0283505 | A1 * | 11/2009 | Naumovski .......... C10M 169/04 219/121.64 |
| 2011/0139753 | A1 * | 6/2011 | Lee ...................... B23K 26/244 219/121.64 |
| 2011/0168682 | A1 | 7/2011 | Hagihara et al. |
| 2017/0001262 | A1 * | 1/2017 | Song ................... B23K 26/244 |
| 2018/0009060 | A1 * | 1/2018 | Yang .................... B23K 26/244 |
| 2018/0043472 | A1 | 2/2018 | Yang et al. |

FOREIGN PATENT DOCUMENTS

| | | |
|---|---|---|
| CN | 102120288 A | 7/2011 |
| CN | 102233481 A | 11/2011 |
| JP | 2011230158 A | 11/2011 |
| WO | 2016192039 A1 | 12/2016 |
| WO | 2017035728 A1 | 3/2017 |
| WO | 2017035729 A1 | 3/2017 |
| WO | 2017075808 A1 | 5/2017 |
| WO | 2017156723 A1 | 9/2017 |
| WO | 2017173650 A1 | 10/2017 |
| WO | 2017173833 A1 | 10/2017 |

OTHER PUBLICATIONS

Yang et al., U.S. Appl. No. 15/684,398 entitled "Method for Laser Welding of Curved Surfaces," filed Aug. 23, 2017.

* cited by examiner

REMOTE LASER WELDING OF OVERLAPPING METAL WORKPIECES AT FAST SPEEDS

TECHNICAL FIELD

The technical field of this disclosure relates generally to laser welding and, more particularly, to a method of remote laser welding together two or more overlapping metal workpieces in which at least one of the workpieces includes a surface coating.

BACKGROUND

Laser welding is a metal joining process in which a laser beam is directed at a metal workpiece stack-up to provide a concentrated energy source capable of effectuating a weld joint between the overlapping constituent metal workpieces. In general, two or more metal workpieces are first aligned and stacked relative to one another such that their faying surfaces overlap and confront to establish a faying interface (or faying interfaces) within an intended weld site. A laser beam is then directed at a top surface of the workpiece stack-up. The heat generated from the absorption of energy from the laser beam initiates melting of the metal workpieces and establishes a molten weld pool within the workpiece stack-up. The molten weld pool penetrates through the metal workpiece impinged by the laser beam and into the underlying metal workpiece or workpieces to a depth that intersects each of the established faying interfaces. And, if the power density of the laser beam is high enough, a keyhole is produced directly underneath the laser beam and is surrounded by the molten weld pool. A keyhole is a column of vaporized metal derived from the metal workpieces that may include plasma.

The laser beam creates the molten weld pool in very short order once it impinges the top surface of the workpiece stack-up. After the molten weld pool is formed, the laser beam may be advanced along the top surface of the workpiece stack-up, which has conventionally involved moving the laser beam along a beam travel pattern of relatively simple shape at laser beam travel speeds of 1.0 to 5.0 meters per minute (m/min). Such advancement of the laser beam translates the molten weld pool along a corresponding route relative to top surface of the workpiece stack-up and leaves behind a trail of molten workpiece material in the wake of the advancing weld pool. This penetrating trail of molten workpiece material cools and solidifies to form a laser weld joint comprised of resolidified composite workpiece material. The resultant weld joint fusion welds the overlapping workpieces together.

The automotive industry is interested in using laser welding to manufacture parts from a variety of workpieces including steel and aluminum workpieces. In one example, a vehicle door body may be fabricated from an inner door panel and an outer door panel that are joined together by a plurality of laser welds. The inner and outer door panels are first stacked relative to each other and secured in place by clamps. A laser beam is then sequentially directed at multiple weld sites around the stacked panels in accordance with a programmed sequence to form the plurality of laser weld joints. At each weld site where laser welding is performed, the laser beam is directed at the stacked panels and conveyed a short distance to produce the weld joint in one of a variety of configurations including, for example, a circle weld joint, a stitch weld joint, or a staple weld joint. The process of laser welding together inner and outer door panels (as well as other vehicle part components such as those used to fabricate hoods, roofs, deck lids, load-bearing structural members, etc.) is typically an automated process that can be carried out quickly and efficiently.

The use of laser welding to join together workpieces that include surface coatings can present challenges. For example, a steel workpiece may include an outer coating of zinc-based material (e.g., zinc or a zinc alloy) for corrosion protection. Zinc has a boiling point of about 906° C., while the melting point of the base steel substrate it coats is typically greater than 1300° C. Thus, when steel workpieces having zinc-based material coatings are laser welded together, high-pressure zinc vapor may be produced at the surfaces of the steel workpieces. The zinc vapor produced at the faying surfaces of the stacked steel workpieces may be forced to diffuse into and through the molten weld pool created by the laser beam unless an alternative escape outlet is provided. When an adequate escape outlet is not provided, zinc vapors may remain trapped in the molten weld pool as it cools and solidifies, which may lead to defects in the resulting weld joint—such as porosity—that can degrade the mechanical properties of the weld joint to such an extent that the joint may be deemed non-conforming.

Steel workpieces that are used in manufacturing practices may also include other types of surface coatings besides zinc or a zinc alloy for performance-related reasons. Other notable surface coatings include aluminum-based coatings such as aluminum, an aluminum-silicon alloy, an aluminum-zinc alloy, or an aluminum-magnesium alloy, to name but a few additional examples. Unlike zinc-based materials, aluminum-based material coatings do not boil at a temperature below the melting point of steel, so they are unlikely to produce high-pressure vapors at the faying interface(s) of the workpiece stack-up. Notwithstanding this fact, these surface coatings can be melted and captured by the molten weld pool at the weld site. The introduction of such disparate molten materials into the molten weld pool can lead to a variety of weld defects that have the potential to degrade the mechanical properties of the laser weld joint. Molten aluminum or aluminum alloys (e.g., AlSi, AlZn, or AlMg alloys), for instance, can dilute the steel content of the molten weld pool and form brittle Fe—Al intermetallic phases within the weld joint as well as negatively affect the cooling behavior of the molten weld pool.

Aluminum workpieces are another intriguing candidate for many automobile component parts and structures due to their high strength-to-weight ratio and their ability to improve the fuel economy of the vehicle. Aluminum workpieces, however, almost always include a surface coating that covers an underlying bulk aluminum substrate. This coating may be a refractory oxide coating that forms passively when fresh aluminum is exposed to atmospheric air or some other oxygen-containing medium. In other instances, the surface coating may be a metallic coating comprised of zinc or tin, or it may be a metal oxide conversion coating comprised of oxides of titanium, zirconium, chromium, or silicon, as disclosed in U.S. Patent Application No. US2014/0360986, the entire contents of which are incorporated herein by reference. The surface coating inhibits corrosion of the underlying aluminum substrate through any of a variety of mechanisms depending on the composition of the coating. But the presence of the surface coating also makes it more challenging to autogeneously fusion weld aluminum workpieces together by way of laser welding.

One of the main challenges involved in laser welding aluminum workpieces is the high solubility of hydrogen in the molten weld pool. Upon solidification of the molten weld pool, dissolved hydrogen becomes trapped, leading to porosity, or it outgases to cause blowholes. In addition to the challenges posed by hydrogen solubility in the molten weld pool, the surface coating of an aluminum workpiece is also believed to contribute to the formation of weld defects in the final laser weld joint. When, for example, the surface coating is a passive refractory oxide coating, the coating is difficult to break apart and disperse due to its high melting point and mechanical toughness. As a result, residual oxides and micro-cracks are oftentimes found in the laser weld joint. As another example, if the surface coating is zinc, the coating may readily vaporize to produce high-pressure zinc vapors that, in turn, may diffuse into and through the molten weld pool and lead to entrained porosity in the final laser weld joint unless provisions are made to vent the zinc vapors away from the weld site, as previously described. The other materials mentioned above that may constitute the surface coating can present similar issues and may ultimately affect and degrade the mechanical properties of the weld joint.

SUMMARY OF THE DISCLOSURE

A method of laser welding a workpiece stack-up that includes overlapping workpieces is disclosed. The workpiece stack-up includes two or more metal workpieces, and at least one of those metal workpieces (and sometimes all of the workpieces) includes a surface coating. In particular, the workpiece stack-up may include two or three overlapping steel workpieces or it may include two or three overlapping aluminum workpieces. In the former case, at least one of the steel workpieces includes a surface coating such as zinc, a zinc alloy, aluminum, an aluminum-silicon alloy, an aluminum-zinc alloy, or an aluminum-magnesium alloy. In the latter case, at least one of the aluminum workpieces includes a surface coating such as a refractory oxide coating, a metal coating (e.g., Zn or Sn), or a metal oxide conversion coating (e.g., oxides of Ti, Zr, Cr, or Si). The disclosed laser welding method employs a specific type of laser welding—namely, remote laser welding—in keyhole welding mode in combination with a high laser beam travel speed to consistently achieve weld joints with good strength properties.

The remote laser welding method involves providing a workpiece stack-up that includes the two or more overlapping metal workpieces (e.g, two or three overlapping steel or aluminum workpieces). The metal workpieces are superimposed on each other such that a faying interface is established between the faying surfaces of each pair of adjacent overlapping workpieces. For example, in one embodiment, the workpiece stack-up includes first and second metal workpieces having first and second faying surfaces, respectively, that overlap and confront one another to establish a single faying interface. In another embodiment, the workpiece stack-up includes an additional third metal workpiece situated between the first and second metal workpieces. In this way, the first and second metal workpieces have first and second faying surfaces, respectively, that overlap and confront opposed faying surfaces of the third metal workpiece to establish two faying interfaces. When the third metal workpiece is present, the first and second metal workpieces may be separate parts or, alternatively, they may be different portions of the same part, such as when an edge of one part is folded back over a free edge of another part.

Once the workpiece stack-up is assembled, a laser beam is directed at, and impinges, a top surface of the workpiece stack-up. The laser beam creates a molten weld pool that penetrates into the workpiece stack-up from the top surface towards the bottom surface. The power density of the laser beam is selected to carry out the laser welding method in keyhole welding mode. In keyhole welding mode, the power density of the laser beam is high enough to vaporize the metal workpieces and produce a keyhole directly underneath the laser beam within the molten weld pool. The keyhole provides a conduit for energy absorption deeper into workpiece stack-up which, in turn, facilitates deeper and narrower penetration of the molten weld pool with a tightly confined heat-affected zone. As such, the molten weld pool created during keyhole welding mode typically has a width at the top surface of the workpiece stack-up that is less than the penetration depth of the weld pool. The keyhole may penetrate the workpiece stack-up fully or partially depending on the composition of the metal workpieces in the stack-up. For example, it is preferable to produce a fully-penetrating keyhole when laser welding steel workpieces while, on the other hand, it is preferably to produce a partially-penetrating keyhole when laser welding aluminum workpieces.

The laser beam is advanced relative to a plane of the top surface of the workpiece stack-up along a beam travel pattern following creation of the molten weld pool and the keyhole. Advancing the laser beam along the beam travel pattern translates the keyhole and the molten weld pool along a route that corresponds to the patterned movement of the laser beam relative to the top surface of the workpiece stack-up. Consequently, advancement of the laser beam along the beam travel pattern leaves behind a trail of molten workpiece material in the wake of the laser beam and the corresponding route of the keyhole and the molten weld pool. This trail of molten workpiece material quickly cools and solidifies into resolidified composite workpiece material that is comprised of material from each workpiece penetrated by the molten weld pool. The collective resolidified composite workpiece material obtained from advancing the laser beam along the beam travel pattern provides a weld joint that autogeneously fusion welds the workpieces together. Once the laser beam has completed its advancement along the beam travel pattern, the laser beam is removed from the top surface of the workpiece stack-up, typically by halting transmission of the laser beam to terminate impingement at the top surface.

A scanning optic laser head of a remote laser welding apparatus directs the laser beam at the top surface of the workpiece stack-up and advances the laser beam along the beam travel pattern. The scanning optic laser head includes optical components that can move the laser beam relative to the plane at the top surface of the workpiece stack-up and also adjust a focal point of the laser beam up or down along a longitudinal axis of the laser beam. In this way, the optical components can be rapidly indexed to advance the laser beam and consequently translate the keyhole and the molten weld pool anywhere within an effective operating envelope and along a wide variety of beam travel patterns. Any type of beam pattern may be traced by the laser beam including a linear stitch pattern, a curved or "C-shaped" staple pattern, a circle spot pattern, a spiral pattern, an oscillating pattern, or any other type of pattern. When tracing the designated beam pattern—whatever it is—the laser beam is advanced from a start point (where impingement is initiated) to an end point (where impingement is terminated) at a travel speed that is relatively high compared to conventional practices. Specifically, the travel speed of the laser beam along the beam travel path ranges from 8 m/min to 100 m/min or, more narrowly, from 12 m/min to 50 m/min, while maintaining the presence of the keyhole.

The high travel speed of the laser beam and the corresponding translation of the keyhole and the molten weld pool are thought to enhance the strength of the resultant laser weld joint. Without being bound by theory, the high travel speed of the laser beam is believed to generate a strong stirring effect within the molten weld pool during translation of the weld pool relative to the top surface of the workpiece stack-up along the beam travel pattern. The more vigorous stirring induced in the molten weld pool better agitates the weld pool to drive the expulsion of entrained gas vapors (e.g., zinc, hydrogen, etc.) through the keyhole and away from the weld site of the workpiece stack-up. It also better disturbs the surface coating(s) in and around the beam travel pattern so as to minimize the likelihood that weld defects derived from the surface coating(s) will accumulate within the resolidified composite workpiece material of the weld joint and negatively affect the strength of the joint and other related properties. The high laser beam travel speed is thus believed to result in less porosity and other weld defects within the weld joint, compared to slower conventional travel speeds, while also minimizing the potential for burn-through and blowholes.

DETAILED DESCRIPTION

The disclosed method of laser welding a workpiece stack-up comprised of two or more overlapping metal workpieces calls for advancing a laser beam relative to a plane of a top surface of the workpiece stack-up along a beam travel pattern at a high beam travel speed of greater than 8 m/min, and more preferably greater than 12 m/min, while maintaining a penetrating keyhole. The laser beam may be a solid-state laser beam or a gas laser beam depending on a variety of factors including, among others, the characteristics of the metal workpieces being joined. Some notable solid-state lasers that may be used are a fiber laser, a disk laser, a direct diode laser, and a Nd:YAG laser, and a notable gas laser that may be used is a $CO_2$ laser, although other types of lasers may certainly be used so long as they are able to create the keyhole and surrounding molten weld pool. Due to the high laser beam travel speeds employed and the possible geometric complexity of the beam travel pattern traced by the laser beam, the disclosed laser welding method is implemented with a remote laser welding apparatus.

Figure 1:
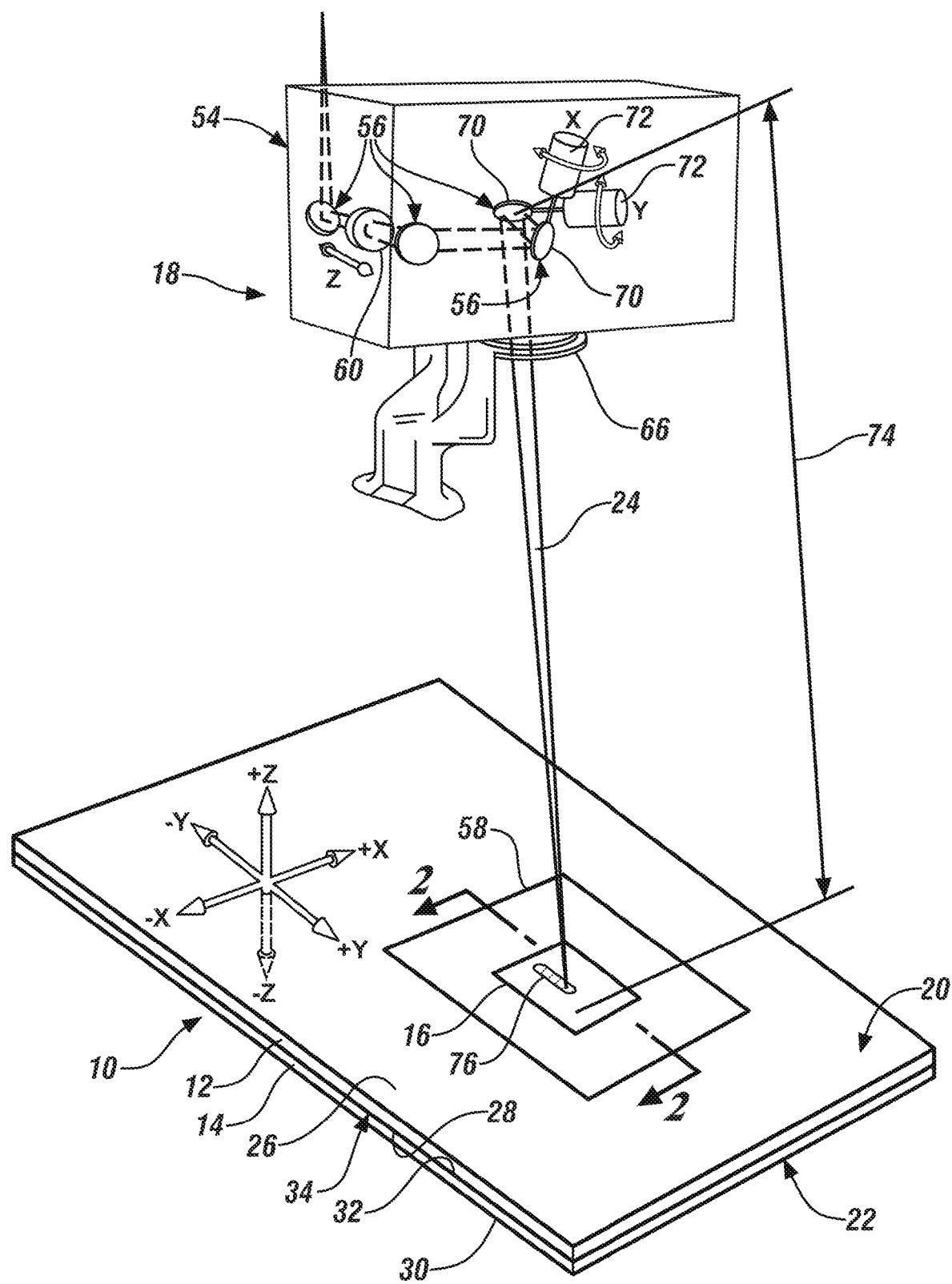
FIG. 1 is a perspective view of an embodiment of a remote laser welding apparatus for forming a laser weld joint within a workpiece stack-up that includes two or more overlapping metal workpieces.
Figure 2:
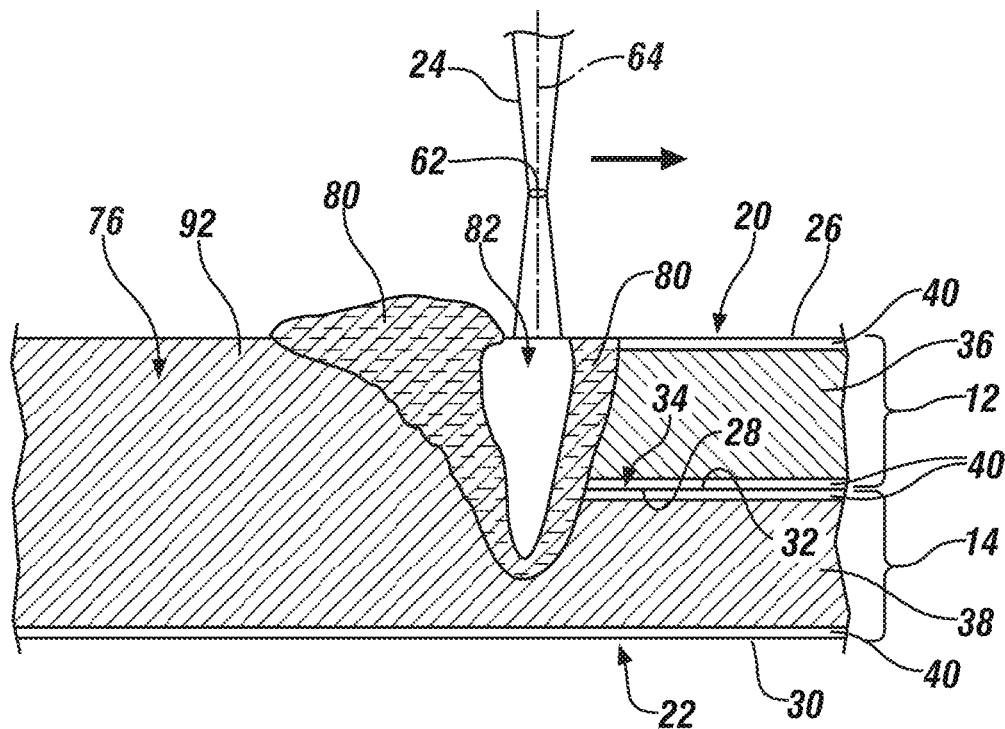
FIG. 2 is a cross-sectional side view (taken along line 2-2) of the workpiece stack-up depicted in FIG. 1 along with a molten weld pool and a keyhole produced by a laser beam that is impinging a top surface of the workpiece stack-up.
Figure 3:
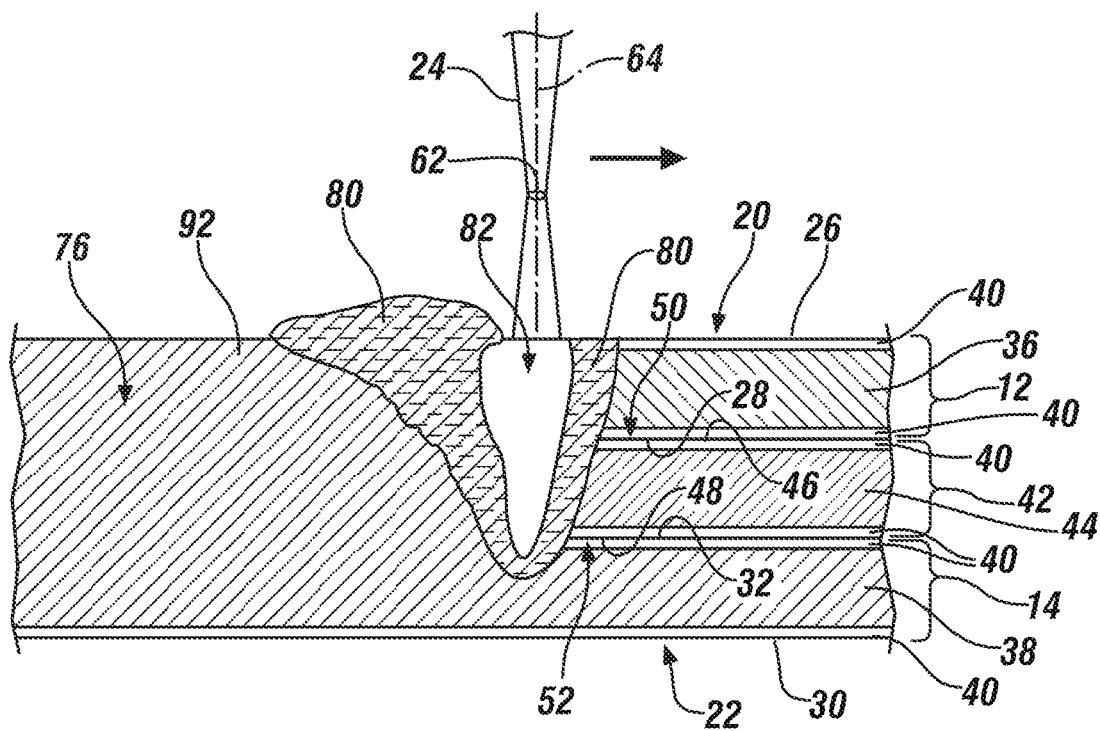
FIG. 3 is a cross-sectional side view of the workpiece stack-up taken from the same perspective as shown in FIG. 2, although here the workpiece stack-up includes three metal workpieces that establish two faying interfaces, as opposed to two metal workpieces that establish a single faying interface as depicted in FIG. 2.

Referring now to FIGS. 1-3, a method of laser welding a workpiece stack-up 10 is illustrated in which the workpiece stack-up 10 includes at least a first metal workpiece 12 and a second metal workpiece 14 that overlap at a weld site 16 where laser welding is practiced using a remote laser welding apparatus 18. The first and second metal workpieces 12, 14 respectively provide a top surface 20 and a bottom surface 22 of the workpiece stack-up 10. The top surface 20 of the workpiece stack-up 10 is made available to the remote laser welding apparatus 18 and can be accessed by a laser beam 24 emanating from the remove laser welding apparatus 18. And since only single side access is needed to perform remote laser welding, there is no need for the bottom surface 22 of the workpiece stack-up 10 to be made available to the remote laser welding apparatus 18 in the same way as the top surface 20. Moreover, while only one weld site 16 is depicted in the Figures for the sake of simplicity, skilled artisans will appreciate that laser welding in accordance with the disclosed method can be practiced at multiple different weld sites spread throughout the same workpiece stack-up 10.

As far as the number of workpieces present, the workpiece stack-up 10 may, as shown in FIGS. 1-2, include only the first and second metal workpieces 12, 14. In this scenario, the first metal workpiece 12 includes an outer surface 26 and a first faying surface 28, and the second metal workpiece 14 includes an outer surface 30 and a second faying surface 32. The outer surface 26 of the first metal workpiece 12 provides the top surface 20 of the workpiece stack-up 10 and the outer surface 30 of the second metal workpiece 14 provides the oppositely-facing bottom surface 22 of workpiece stack-up 10. Conversely, since the two metal workpieces 12, 14 are the only two workpieces present in the workpiece stack-up 10, the first and second faying surfaces 28, 32 of the first and second metal workpieces 12, 14 overlap and confront one another to establish a faying interface 34 that extends through the weld site 16. In other embodiments, one of which is describe below in connection with FIG. 3, the workpiece stack-up 10 may include an additional metal workpiece such that the workpiece stack-up 10 includes three metal workpieces instead of only two as shown in FIGS. 1-2.

The term "faying interface" is used broadly in the present disclosure and is intended to encompass a wide range of overlapping relationships between the confronting first and second faying surfaces 28, 32 that can accommodate the practice of laser welding. For instance, the faying surfaces 28, 32 may establish the faying interface 34 by being in direct or indirect contact. The faying surfaces 28, 32 are in direct contact with each other when they physically abut and are not separated by a discrete intervening material layer or gaps that fall outside of normal assembly tolerance ranges. The faying surfaces 28, 32 are in indirect contact when they are separated by a discrete intervening material layer—and thus do not experience the type of extensive interfacial abutment that typifies direct contact—yet are in close enough proximity that laser welding can be practiced. As another example, the faying surfaces 28, 32 may establish the faying interface 34 by being separated by gaps that are purposefully imposed. Such gaps may be imposed between the faying surfaces 28, 32 by creating protruding features on one or both of the faying surfaces 28, 32 through laser scoring, mechanical dimpling, or otherwise. They may also be caused by an assembly gap, the use of a non-planar workpiece, or through spring back. The imposed gaps maintain intermittent contact points between the faying surfaces 28, 32 that keep the faying surfaces 28, 32 spaced apart outside of and around the contact points by up to 1.5 mm and, preferably, between 0.1 mm and 0.2 mm.

As shown best in FIG. 2, the first metal workpiece 12 includes a first base metal substrate 36 and the second metal workpiece 14 includes a second base metal substrate 38. The first and second base metal substrates 36, 38 may be composed of steel or they may be composed of aluminum (i.e., an aluminum-based material). If composed of steel, each of the base metal substrates 36, 38 (referred to for the moment as the first and second base steel substrates 36, 38) may be separately composed of any of a wide variety of steels including a low carbon (mild) steel, interstitial-free (IF) steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and press-hardened steel (PHS). Moreover, each of the first and second base steel substrates 36, 38 may have been treated to obtain a particular set of mechanical properties, including being subjected to heat-treatment processes such as annealing, quenching, and/or tempering. The first and second base steel substrates 36, 38 may be hot or cold rolled to their final thicknesses and may be pre-fabricated to have a particular profile suitable for assembly into the workpiece stack-up 10.

If the first and second base metal substrates 36, 38 are composed of aluminum, each of the base metal substrates 36, 38 (referred to for the moment as the first and second base aluminum substrates) may be separately composed of elemental aluminum or an aluminum alloy that includes at least 85 wt % aluminum. Some notable aluminum alloys that may constitute the first and/or second base aluminum substrates 36, 38 are an aluminum-magnesium alloy, an aluminum-silicon alloy, an aluminum-magnesium-silicon alloy, or an aluminum-zinc alloy. Additionally, each of the base aluminum substrates 36, 38 may be separately provided in wrought or cast form. For example, each of the base aluminum substrates 36, 38 may be composed of a 4xxx, 5xxx, 6xxx, or 7xxx series wrought aluminum alloy sheet layer, extrusion, forging, or other worked article. Or, as another example, each of the base aluminum substrates 36, 38 may be composed a 4xx.x, 5xx.x, or 7xx.x series aluminum alloy casting. Some more specific kinds of aluminum alloys that can be used as the first and/or second base aluminum substrates 36, 38 include, but are not limited to, AA5754 aluminum-magnesium alloy, AA6022 aluminum-magnesium-silicon alloy, AA7003 aluminum-zinc alloy, and Al-10Si-Mg aluminum die casting alloy. The first and/or second base aluminum substrates 36, 38 may be employed in a variety of tempers including annealed (O), strain hardened (H), and solution heat treated (T) depending on the desired properties of the workpieces 12, 14.

At least one of the first or second base metal substrates 36, 38—and possibly both—includes a surface coating 40. As shown in FIG. 2, each of the first and second base metal substrates 36, 38 is coated with a surface coating that, in turn, provides the workpieces 12, 14 with their respective exterior outer surfaces 26, 30 and their respective faying surfaces 28, 32. In other embodiments, only the first base metal substrate 36 includes a surface coating 40 while the second metal substrate 36 is uncoated or bare, or only the second base metal substrate 38 includes the surface coating while the first base metal substrate 36 is uncoated or bare. The exact composition of the surface coating 40 depends largely on the metal composition of the underlying base metal substrate 36, 38. The surface coating(s) 40 may be employed on one or both of the base metal substrates 36, 38 for various reasons including corrosion protection, strength enhancement, and/or to improve processing, among other reasons.

Regarding steel workpieces, the surface coating 40 present on one or both of the base steel substrates 36, 38 is preferably comprised of a zinc-based material or an aluminum-based material. Some examples of a zinc-based material include zinc and a zinc alloy such as a zinc-nickel alloy or a zinc-iron alloy. Some examples of a suitable aluminum-based material include aluminum, an aluminum-silicon alloy, an aluminum-zinc alloy, and an aluminum-magnesium alloy. A coating of a zinc-based material may be applied by hot-dip galvanizing, electro-galvanizing, or galvannealing, typically to a thickness of 2 µm to 16 mµ, and a coating of an aluminum-based material may be applied by dip coating, typically to a thickness of 2 µm to 10 µM, although other coating procedures and thicknesses of the attained coatings may be employed. Taking into the account the thicknesses of the base steel substrates 36, 38 and their surface coating(s) 40 (if present), the overall thickness of each of the first and second steel workpieces 12, 14 preferably ranges from 0.4 mm to 4.0 mm, and more narrowly from 0.5 mm to 2.0 mm, at least at the weld site 16. The thicknesses of the first and second steel workpieces 12, 14 may be the same of different from each other.

Regarding aluminum workpieces, the surface coating 40 present on one or both of the base aluminum substrates 36, 38 may be a refractory oxide coating that forms passively when fresh aluminum from the base aluminum substrate 36, 38 is exposed to atmospheric air or some other oxygen-containing medium. The surface coating 40 may also be a metallic coating comprised of zinc or tin, or it may be a metal oxide conversion coating comprised of oxides of titanium, zirconium, chromium, or silicon. A typical thickness of the surface coating 40, if present, lies anywhere from 1 nm to 10 μm depending on its composition. Taking into account the thicknesses of the base aluminum substrates 36, 38 and their surface coating(s) 40 (if present), the overall thickness of each of the first and second aluminum workpieces 12, 14 preferably ranges of 0.3 mm to 6.0 mm, and more narrowly from 0.5 mm to 3.0 mm, at least at the weld site 16. The thicknesses of the first and second aluminum workpieces 12, 14 may be the same as or different from each other.

FIGS. 1-2 illustrate an embodiment of the remote laser welding method in which the workpiece stack-up 10 includes two overlapping metal workpieces 12, 14 that have the single faying interface 34. Of course, as shown in FIG. 3, the workpiece stack-up 10 may include an additional third metal workpiece 42 situated between the first and second metal workpieces 12, 14. The third metal workpiece 42, if present, includes a third base metal substrate 44 that has the same composition (steel or aluminum) as the other two base metal substrates 36, 38 in the stack-up 10. And, like the other base metal substrates 36, 38, the third base metal substrate 44 may be bare or coated with the same surface coating 40 (as shown) described above. Indeed, when the workpiece stack-up 10 includes the first, second, and third overlapping metal workpieces 12, 14, 42, the base metal substrate 36, 38, 44 of at least one of the metal workpieces 12, 14, 42, and possibly all of them, includes the surface coating 40. As for the characteristics of the third base metal substrate 44, the descriptions above regarding the first and second base metal substrates 36, 38 are equally applicable to that substrate 44 as well.

As a result of stacking the first, second, and third metal workpieces 12, 14, 42 in overlapping fashion to provide the workpiece stack-up 10, the third metal workpiece 42 has two faying surfaces 46, 48. One of the faying surfaces 46 overlaps and confronts the faying surface 28 of the first metal workpiece 12 and the other faying surface 48 overlaps and confronts the faying surface 32 of the second metal workpiece 14, thus establishing two faying interfaces 50, 52 within the workpiece stack-up 10 that extend through the weld site 16. These faying interfaces 50, 52 are the same type and encompass the same attributes as the faying interface 34 already described above with respect to FIGS. 1-2. Consequently, in this embodiment as described herein, the outer surfaces 26, 30 of the flanking first and second metal workpieces 12, 14 still generally face away from each other in opposite directions and constitute the top and bottom surfaces 20, 22 of the workpiece stack-up 10. Skilled artisans will know and appreciate how to adjust the remote laser welding method described in the present disclosure depending on whether the workpiece stack-up 10 includes two or three overlapping metal workpieces.

Referring back to FIGS. 1-3, the remote laser welding apparatus 18 includes a scanning optic laser head 54. The scanning optic laser head 54 directs the laser beam 24 at the top surface 20 of the workpiece stack-up 10 which, here, is provided by the outer surface 26 of the first metal workpiece 12. The scanning optic laser head 54 is preferably mounted to a robotic arm (not shown) that can quickly and accurately carry the laser head 54 to many different preselected weld sites on the workpiece stack-up 10 in rapid programmed succession. The laser beam 24 used in conjunction with the scanning optic laser head 54 is preferably a solid-state laser beam operating with a wavelength in the near-infrared range (commonly considered to be 700 nm to 1400 nm) of the electromagnetic spectrum. Additionally, the laser beam 24 has a power level capability that can attain a power density sufficient to produce a keyhole within the workpiece stack-up 10. The power density needed to produce a keyhole within overlapping steel workpieces is typically 0.5-1.0 $MW/cm^2$ while the power density needed to produce a keyhole within overlapping aluminum workpieces is typically 1.0 $MW/cm^2$.

Some examples of suitable solid-state laser beams that may be used in the present remote laser welding method include a fiber laser beam, a disk laser beam, and a direct diode laser beam. A preferred fiber laser beam is a diode-pumped laser beam in which the laser gain medium is either an optical fiber doped with a rare-earth element (e.g., erbium, ytterbium, neodymium, dysprosium, praseodymium, thulium, etc.). A preferred disk laser beam is a diode-pumped laser beam in which the gain medium is a thin laser crystal disk doped with a rare earth element (e.g., a ytterbium-doped yttrium-aluminum garnet (Yb:YAG) crystal coated with a reflective surface) and mounted to a heat sink. And a preferred direct diode laser beam is a combined laser beam (e.g., wavelength combined) derived from multiple diodes in which the gain medium are semiconductors such as those based on aluminum gallium arsenide (AlGaAS) or indium gallium arsenide (InGaAS). Other solid-state laser beams not specifically mentioned here may of course be used.

The scanning optic laser head 54 includes an arrangement of mirrors 56 that can maneuver the laser beam 24 relative to a plane oriented along the top surface 20 of the workpiece stack-up 10 within an operating envelope 58 that encompasses the weld site 16. Here, as illustrated in FIG. 1, the plane of the top surface 20 spanned by the operating envelope 58 is labeled the x-y plane since the position of the laser beam 24 within the plane is identified by the "x" and "y" coordinates of a three-dimensional coordinate system. In addition to the arrangement of mirrors 56, the scanning optic laser head 54 also includes a z-axis focal lens 60, which can move a focal point 62 (FIGS. 2-3) of the laser beam 24 along a longitudinal axis 64 of the laser beam 24 to thus vary the location of the focal point 62 in a z-direction that is oriented perpendicular to the x-y plane in the three-dimensional coordinate system established in FIG. 1. Furthermore, to keep dirt and debris from adversely affecting the optical system and the integrity of the laser beam 24, a cover slide 66 may be situated below the scanning optic laser head 54. The cover slide 66 protects the arrangement of mirrors 56 and the z-axis focal lens 60 from the surrounding environment yet allows the laser beam 24 to pass out of the laser head 54 without substantial disruption.

Figure 5:
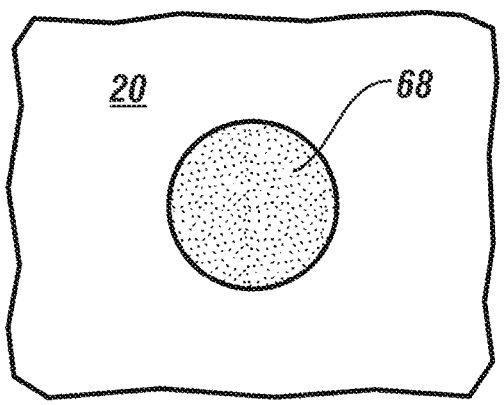
FIG. 5 is a plan view of the projected sectional area of the laser beam at the plane of the top surface of the workpiece stack-up according to one embodiment.
Figure 6:
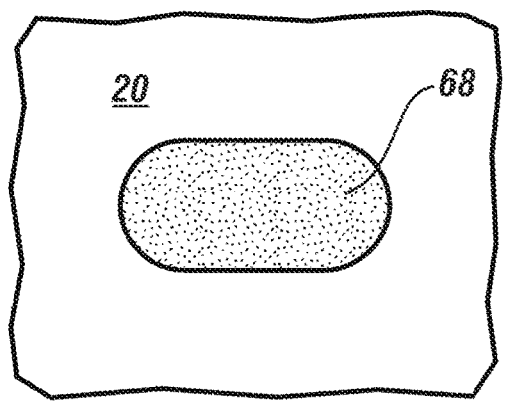
FIG. 6 is a plan view of the projected sectional area of the laser beam at the plane of the top surface of the workpiece stack-up according to another embodiment.
Figure 7:
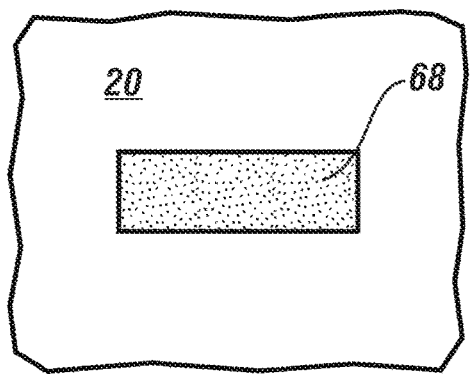
FIG. 7 is a plan view of the projected sectional area of the laser beam at the plane of the top surface of the workpiece stack-up according to still another embodiment.
Figure 8:
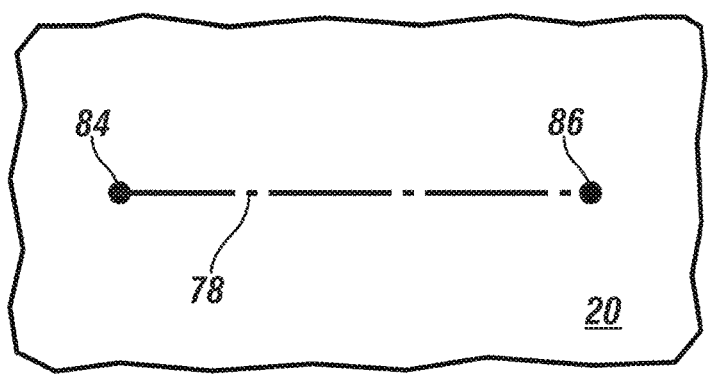
FIG. 8 depicts an embodiment of the beam travel pattern as projected onto the top surface of the workpiece stack-up that may be traced by a laser beam, and thus followed by a keyhole and surrounding molten weld pool, during formation of a laser weld joint between the two or more overlapping metal workpieces included in the workpiece stack-up.
Figure 9:
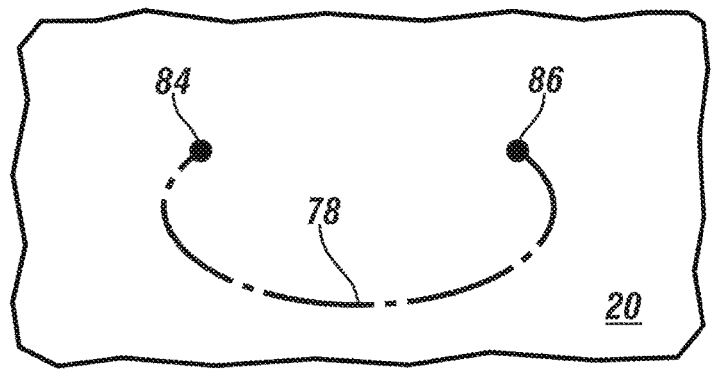
FIG. 9 depicts another embodiment of the beam travel pattern as projected onto the top surface of the workpiece stack-up that may be traced by a laser beam, and thus followed by a keyhole and surrounding molten weld pool, during formation of a laser weld joint between the two or more overlapping metal workpieces included in the workpiece stack-up.

The scanning optic laser head 54 may optionally be equipped with a beam shaper, such as a diffractive optical element (DOE), to shape a projected sectional area 68 of the laser beam 24 at the plane of the top surface 20 of the workpiece stack-up 10, as illustrated in FIGS. 5-7. The beam shaper can tailor the projected sectional area 68 of the laser beam 24 to any of a wide variety of shapes. For example, as shown in FIG. 5, the projected sectional area 68 of the laser beam 24 at the plane of the top surface 20 of the workpiece stack-up 10 may be circular with a diameter that ranges from 0.1 mm to 6 mm. In another example, as shown in FIG. 6, the projected sectional area 68 of the laser beam 24 at the plane of the top surface 20 of the workpiece stack-up 10 may be elliptical with a short axis that ranges from 0.1 mm to 6 mm and a long axis that ranges from 0.15 mm to 10 mm still further, as shown in FIG. 7, the projected sectional area 68 of the laser beam 24 at the plane of the top surface 20 of the workpiece stack-up 10 may be rectangular with a width that ranges 0.1 mm to 8 mm and a length (perpendicular to the width) that ranges 0.1 mm to 10 mm. Other shapes of the projected sectional area 68 of the laser beam 24 are of course possible despite not being shown or described here.

The arrangement of mirrors 56 and the z-axis focal lens 60 cooperate during remote laser welding to dictate the desired movement of the laser beam 24 within the operating envelope 58 at the weld site 16 as well as the position of the focal point 62 along the z-axis. The arrangement of mirrors 56, more specifically, includes a pair of tiltable scanning mirrors 70. Each of the tiltable scanning mirrors 70 is mounted on a galvanometer 72. The two tiltable scanning mirrors 70 can move the location at which the laser beam 24 impinges the top surface 20 of the workpiece stack-up 10 anywhere in the x-y plane of the operating envelope 58 through precise coordinated tilting movements executed by the galvanometers 72. At the same time, the z-axis focal lens 60 controls the location of the focal point 62 of the laser beam 24 in order to help administer the laser beam 24 at the correct power density. All of these optical components 60, 70 can be rapidly indexed in a matter of milliseconds or less to advance the laser beam 24 relative to the top surface 20 of the workpiece stack-up 10 along a beam travel pattern at a high laser beam travel speed somewhere between 8 m/min and 100 m/min or, more narrowly, between 12 m/min and 50 m/min.

A characteristic that differentiates remote laser welding (also sometimes referred to as "welding on the fly") from other conventional forms of laser welding is the focal length of the laser beam 24. Here, as shown in best in FIG. 1, the laser beam 24 has a focal length 74, which is measured as the distance between the focal point 62 and the last tiltable scanning mirror 70 that intercepts and reflects the laser beam 24 prior to the laser beam 24 impinging the top surface 20 of the workpiece stack-up 10 (also the outer surface 26 of the first workpiece 12). The focal length 74 of the laser beam 24 is preferably in the range of 0.4 meters to 2.0 meters with a diameter of the focal point 62 typically ranging anywhere from 350 μm to 700 μm. The scanning optic laser head 54 shown generally in FIG. 1 and described above, as well as others that may be constructed somewhat differently, are commercially available from a variety of sources. Some notable suppliers of scanning optic laser heads and lasers for use with the remote laser welding apparatus 18 include HIGHYAG (Kleinmachnow, Germany) and TRUMPF Inc. (Farmington, Conn., USA).

In the presently disclosed method, as illustrated generally in the Figures, a laser weld joint 76 (FIGS. 1-4) is formed between the first and second metal workpieces 12, 14 (or between the first, second, and third metal workpieces 12, 14, 42 as shown in FIG. 3) by advancing the laser beam 24 along a beam travel pattern 78 (FIGS. 4 and 8-10) relative to a plane of the top surface 20 of the workpiece stack-up 10. As shown best in FIGS. 1-4, the laser beam 24 is initially directed at, and impinges, the top surface 20 of the workpiece stack-up 10 within the weld site 16. The heat generated from absorption of the focused energy of the laser beam 24 initiates melting of the first and second metal workpieces 12, 14 (and the third metal workpiece 42 if present) to create a molten weld pool 80 that penetrates into the workpiece stack-up 10 from the top surface 20 towards the bottom surface 22. The molten weld pool 80 penetrates far enough into the workpiece stack-up 10 that it intersects each faying interface (34 or 50, 52) present within the workpiece stack-up 10 between the top and bottom surfaces 20, 22.

The laser beam 24, moreover, has a power density sufficient to vaporize the workpiece stack-up 10 directly beneath where it impinges the top surface 20 of the stack-up 10. This vaporizing action produces a keyhole 82, which is a column of vaporized workpiece metal that usually contains plasma. The keyhole 82 is formed within the molten weld pool 80 and exerts an outwardly-directed vapor pressure sufficient to prevent the surrounding molten weld pool 80 from collapsing inward. Like the molten weld pool 80, the keyhole 82 also penetrates into the workpiece stack-up 10 from the top surface 20 towards the bottom surface 22 and intersects each faying interface (34 or 50, 52) present within the workpiece stack-up 10. The keyhole 82 provides a conduit for the laser beam 24 to deliver energy down into the workpiece stack-up 10, thus facilitating relatively deep and narrow penetration of the molten weld pool 80 into the workpiece stack-up 10 and a relatively small surrounding heat-affected zone. The keyhole 82 and the surrounding molten weld pool 80 may fully or partially penetrate the workpiece stack-up 10.

Figure 4:
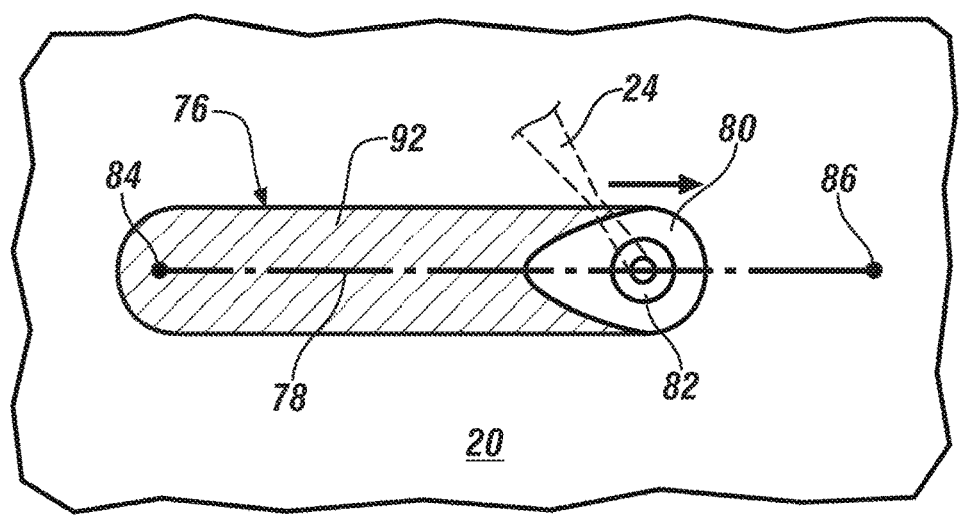
FIG. 4 is a plan view of the top surface of a workpiece stack-up during remote laser welding in which the laser beam is being advanced relative to a plane of the top surface along a generic representative beam travel pattern from a start point to an end point.

After the molten weld pool 80 and the keyhole 82 are created, and referring now to FIG. 4, the laser beam 24 is advanced relative to a plane of the top surface 20 of the workpiece stack-up from a start point 84 to an end point 86 along the beam travel pattern 78 at a high laser beam travel speed somewhere between 8 m/min and 100 m/min or, more narrowly, between 12 m/min and 50 m/min. The start point 84 of the beam travel pattern 78 is the location where the laser beam 24 initially impinges the top surface 20 and, consequently, the end point 86 is the location on the top surface 20 where impingement of the laser beam 24 terminates. Advancement of the laser beam 24 between those two points 84, 86 along the beam travel pattern 78 at the prescribed laser beam travel speed is managed by precisely controlling the coordinated movements of the tiltable scanning mirrors 70 of the scanning optic laser head 54. Such a system can rapidly move the laser beam 24 to trace a wide variety of beam travel patterns of simple or complex shape as projected onto the plane of the top surface 20 of the workpiece stack-up 10. Some examples of suitable beam travel patterns 78 that may be traced by the laser beam 24 are shown in FIGS. 8-12 and described below.

The beam travel pattern 78 that is traced by the laser beam 24 may be a linear stitch pattern (FIG. 8), a curved or "C-shaped" staple pattern (FIG. 9), a circle spot pattern (FIG. 10), a spiral pattern (FIG. 11), or an oscillating pattern (FIG. 12), among others. In the linear stitch pattern of FIG. 8, the laser beam 24 is advanced from the start point 84 to the end point 86 in a straight line relative to the plane of the top surface 20. In the curved staple pattern of FIG. 9, the laser beam 24 is advanced from the start point 84 to the end point 86 in a semi-circular or semi-elliptical path relative to the plane of the top surface 20. In the circle pattern of FIG. 10, the laser beam 24 is advanced from the start point 84 to the end point 86 along a circular path or elliptical path relative to the plane of the top surface 20. Multiple concentric circle paths may be traced, if desired, at the same weld site 16 as shown. In the spiral pattern of FIG. 11, the laser beam 24 is advanced from the start point 84 to the end point

86 along a path that revolves radially outwardly from an interior point 88. The interior point 88 may be the start point 84, as shown here, or it may the end point 86 depending on whether the laser beam is advanced radially inwardly or radially outwardly along the several turnings of the spiral pattern. And finally, in the oscillating pattern of FIG. 12, the laser beam is advanced from the start point 84 to the end point 86 along any of the patterns shown in FIGS. 8-11, plus others not shown, while oscillating back and forth in a direction transverse to a median forward direction 90 of the laser beam 24.

Figure 10:
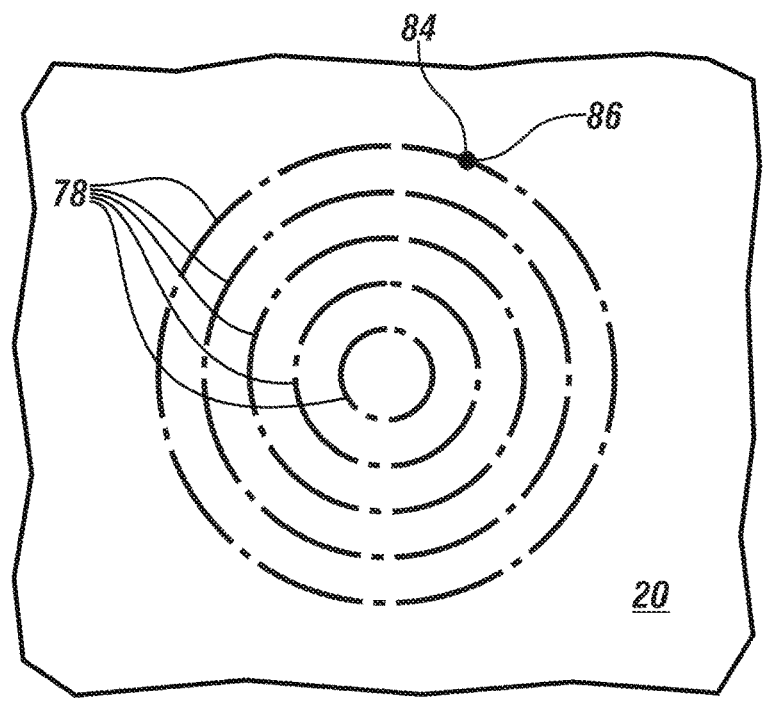
FIG. 10 depicts yet another embodiment of the beam travel pattern as projected onto the top surface of the workpiece stack-up that may be traced by a laser beam, and thus followed by a keyhole and surrounding molten weld pool, during formation of a laser weld joint between the two or more overlapping metal workpieces included in the workpiece stack-up.
Figure 11:
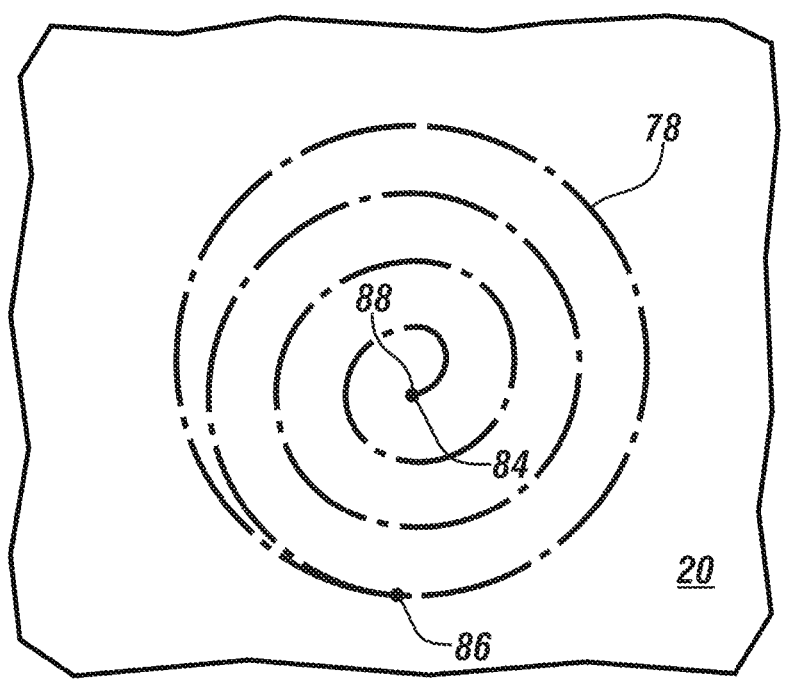
FIG. 11 depicts still another embodiment of the beam travel pattern as projected onto the top surface of the workpiece stack-up that may be traced by a laser beam, and thus followed by a keyhole and surrounding molten weld pool, during formation of a laser weld joint between the two or more overlapping metal workpieces included in the workpiece stack-up.
Figure 12:
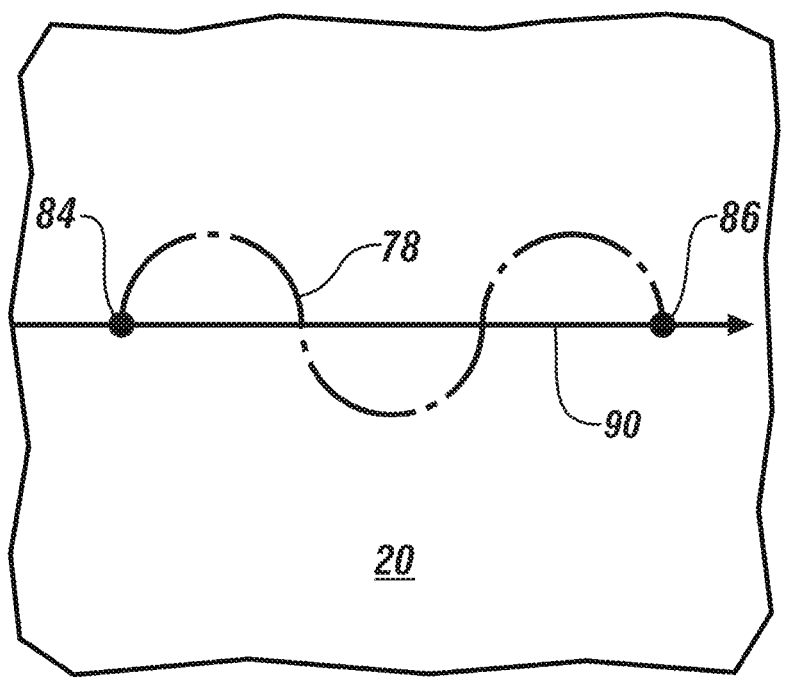
FIG. 12 depicts another embodiment of the beam travel pattern as projected onto the top surface of the workpiece stack-up that may be traced by a laser beam, and thus followed by a keyhole and surrounding molten weld pool, during formation of a laser weld joint between the two or more overlapping metal workpieces included in the workpiece stack-up.

In embodiments where the beam travel pattern 78 includes multiple concentric circular weld paths or a spiral weld path, as shown, for example, in FIGS. 10 and 11, the step-size of the multiple circular weld paths or the turnings of the spiral weld path may be sized somewhat small to accentuate the affects of the high travel speed of the laser beam 24. The term step-size as used here refers to the distance between radially aligned points on adjacent circular weld paths or adjacent turnings of a spiral weld path and, essentially, defines how close the adjacent circular weld paths or the adjacent turnings of a spiral weld path are to each other within the beam travel pattern 78. Each pair of adjacent concentric circular weld paths or each pair of adjacent turnings of a spiral weld path may, for example, have a step-size that ranges from 0.01 mm to 0.80 mm. Such tight spacings between the concentric circular weld paths or the turnings of a spiral weld path can, in some instances, help reduce the power density needed to produce the keyhole 82 when combined with the high travel speed of the laser beam 24.

As the laser beam 24 is being advanced along the beam travel pattern 78 at the high travel speed, the keyhole 82 and the molten weld pool 80 are consequently translated at the same speed along a corresponding route relative to the top surface 20 since they track the movement of the laser beam 24. In this way, the molten weld pool 80 momentarily leaves behind a trail of molten workpiece material in the wake of the travel path of the laser beam 24 and the corresponding route of the weld pool 80. This trail of molten workpiece material quickly solidifies into resolidified composite workpiece material 92 (FIGS. 2-4) that is comprised of material (steel or aluminum) from each of the metal workpieces 12, 14 (and 42 if present) penetrated by the molten weld pool 80. Eventually, when the laser beam 24 is finished tracing the beam travel pattern 78, the transmission of the laser beam 24 is terminated so that the laser beam 24 no longer impinges the top surface 20 of the workpiece stack-up 10. At this time, the keyhole 82 collapses and the molten weld pool 80 solidifies to become part of the resolidified composite workpiece material 92.

The depth of penetration of the keyhole 82 and the surrounding molten weld pool 80 is controlled during advancement of the laser beam 24 along the beam travel pattern 78 to ensure the metal workpieces 12, 14 (and optionally 42) are fusion welded together by the weld joint 76. In particular, as mentioned above, the keyhole 82 and the molten weld pool 80 intersect each faying interface (34 or 50, 52) present within the workpiece stack-up 10 between the top and bottom surfaces 20, 22 of the stack-up 10. By causing the keyhole 82 and the molten weld pool 80 to penetrate far enough into the workpiece stack-up 10 so that they intersect each faying interface (34 or 50, 52) of the stack-up 10—either by way of full or partial penetration—the resolidified composite workpiece material 92 produced along the beam travel pattern 78 serves to autogeneously fusion weld the metal workpieces 12, 14 (and optionally 42) together within the weld joint 76.

The keyhole 82 and the molten weld pool 80 may penetrate to different extents depending on a number of factors including, for example, whether the workpiece stack-up 10 includes steel workpieces or aluminum workpieces. In one embodiment, such as when the workpiece stack-up 10 includes overlapping steel workpieces 12, 14 (and possibly 42), the keyhole 82 may fully penetrate the workpiece stack-up 10. In other words, the keyhole 82 and the surrounding molten weld pool 80 entirely traverse the thicknesses of both the first and second metal workpieces 12, 14. In another embodiment, such as when the workpiece stack-up 10 includes overlapping aluminum workpieces 12, 14 (and possibly 42), the keyhole 82 and the surrounding molten weld pool 80 may partially penetrate the workpiece stack-up 10. This means that the keyhole 82 and the molten weld pool 80 entirely traverse the thickness of the first aluminum workpiece 12 (and the thickness of the third aluminum workpiece 42 if present) yet only partially traverse the thickness of the second aluminum workpiece 14. Of course, in some instances, a fully penetrating keyhole 82 and molten weld pool 80 may be employed with overlapping aluminum workpieces while a partially penetrating keyhole 82 and molten weld pool 80 may be employed with overlapping steel workpieces.

The power level, travel velocity, and/or focal point position of the laser beam 24 may be controlled during the laser welding process so that the keyhole 82 and the molten weld pool 80 penetrate the workpiece stack-up 10 to the appropriate depth. In particular, the various process parameters that are used to dictate the penetration depth of the keyhole 82 and the surrounding molten weld pool 80 can be programmed into a weld controller capable of executing the instructions with precision as the laser beam 24 is being advanced along the beam travel pattern 78. The same weld controller or a different controller may synchronously control the galvanometers 72 in order to advance the laser beam 24 relative to the top surface 20 of the workpiece stack-up 10 along the beam travel pattern 78. While the various process parameters of the laser beam 24 can vary when used in conjunction with the high laser beam travel speed, in many instances, the power level of the laser beam 24 may be set to between 0.2 kW and 50.0 kW, or more narrowly between 1.0 kW and 10 kW, and the focal point 62 of the laser beam 24 is preferably set somewhere between 20 mm below the bottom surface 22 of the workpiece stack-up 10 (also the outer surface 30 of the second metal workpiece 14) and 20 mm above the top surface 20 of the stack-up 10 (also the outer surface 26 of the first metal workpiece 12).

The advancement of the laser beam 24 along the beam travel pattern 78 at the high laser travel speed is believed to impart good and repeatable strength, in particular peel strength, to the weld joint 76 by minimizing the prevalence of weld defects derivable from the surface coating 40 present on one or more of the metal workpieces 12, 14 (and optionally 42). Without being bound by theory, the high travel speed of the laser beam 24 is believed to generate a strong stirring effect within the molten weld pool 80 during translation of the weld pool 80 relative to the top surface 20 of the workpiece stack-up along the beam travel pattern 78. The more vigorous stirring associated with the high laser beam travel speed drives the expulsion of entrained gas vapors (e.g., zinc, hydrogen, etc.) out of the molten weld pool 80 and away from the weld site 16 of the workpiece stack-up 10 while, at the same time, disturbing the surface coating(s) 40 in and around the beam travel pattern 78 so as to minimize the likelihood that weld defects derived from the surface coating(s) 40 will accumulate within the resolidified composite workpiece material 92 of the weld joint 76.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of remote laser welding a workpiece stack-up that includes at least two overlapping metal workpieces, the method comprising:

providing a workpiece stack-up that includes overlapping metal workpieces, each of which includes a base metal substrate composed of steel or aluminum, the workpiece stack-up comprising at least a first metal workpiece and a second metal workpiece, the first metal workpiece providing a top surface of the workpiece stack-up and the second metal workpiece providing a bottom surface of the workpiece stack-up, wherein a faying interface is established between each pair of adjacent overlapping metal workpieces within the workpiece stack-up, and wherein at least one of the metal workpieces in the workpiece stack-up includes a surface coating;

directing a laser beam at the top surface of the workpiece stack-up to produce a keyhole and a molten weld pool that surrounds the keyhole, each of the keyhole and the molten weld pool penetrating into the workpiece stack-up from the top surface of the stack-up towards the bottom surface of the stack-up; and forming a weld joint by advancing the laser beam relative to a plane of the top surface of the workpiece stack-up and along a beam travel pattern so as to translate the keyhole and the surrounding molten weld pool along a corresponding route relative to the top surface of the workpiece stack-up, the laser beam being advanced from a start point of the beam travel pattern to an end point of the beam travel pattern at a laser beam travel speed that ranges from 8 meters/minute to 100 meters per minute.

2. The method set forth in claim 1, wherein the first metal workpiece has an outer surface and a first faying surface, and the second metal workpiece has an outer surface and a second faying surface, the outer surface of the first metal workpiece providing the top surface of the workpiece stack-up and the outer surface of the second metal workpiece providing the bottom surface of the workpiece stack-up, and wherein the first and second faying surfaces of the first and second metal workpieces overlap and confront to establish a faying interface.

3. The method set forth in claim 1, wherein the first metal workpiece has an outer surface and a first faying surface, and the second metal workpiece has an outer surface and a second faying surface, the outer surface of the first metal workpiece providing the top surface of the workpiece stack-up and the outer surface of the second metal workpiece providing the bottom surface of the workpiece stack-up, and wherein the workpiece stack-up comprises a third metal workpiece situated between the first and second metal workpieces, the third metal workpiece having opposed faying surfaces, one of which overlaps and confronts the first faying surface of the first metal workpiece to establish a first faying interface and the other of which overlaps and confronts the second faying surface of the second metal workpiece to establish a second faying interface.

4. The method set forth in claim 1, wherein each of the overlapping metal workpieces in the workpiece stack-up is a steel workpiece, and wherein at least one of the steel workpieces includes a surface coating of zinc, a zinc alloy, or an aluminum-based material.

5. The method set forth in claim 4, wherein the aluminum-based material is elemental aluminum, an aluminum-silicon alloy, an aluminum-zinc alloy, or an aluminum-magnesium alloy.

6. The method set forth in claim 4, wherein the keyhole and the surrounding molten weld pool fully penetrate into the workpiece stack-up during advancement of the laser beam along the beam travel pattern.

7. The method set forth in claim 1, wherein each of the overlapping metal workpieces in the workpiece stack-up is an aluminum workpiece, and wherein at least one of the aluminum workpieces includes a surface coating of a refractory oxide.

8. The method set forth in claim 7, wherein the keyhole and the surrounding molten weld pool penetrate into the workpiece stack-up far enough that they intersect each faying interface established within the stack-up, but only partially penetrate stack-up, during advancement of the laser beam along the beam travel pattern.

9. The method set forth in claim 1, wherein advancing the laser beam is performed by a scanning optic laser head having tiltable scanning mirrors whose movements are coordinated to move the laser beam relative to the plane of the top surface of the workpiece stack-up.

10. The method set forth in claim 1, wherein the laser beam is a solid-state fiber laser beam, a solid-state disk laser beam, or a solid-state direct diode laser beam.

11. The method set forth in claim 1, wherein the laser beam has a power level ranging from 0.2 kW to 50 kW during advancement of the laser beam along the beam travel pattern.

12. The method set forth in claim 1, wherein a focal point of the laser beam is positioned between 20 mm below the bottom surface of the workpiece stack-up and 20 mm above the top surface of the workpiece stack-up on a longitudinal axis of the laser beam during advancement of the laser beam along the beam travel pattern.

13. A method of remote laser welding a workpiece stack-up that includes at least two overlapping metal workpieces, the method comprising:

providing a workpiece stack-up that includes overlapping metal workpieces, each of which includes a base metal substrate composed of steel or aluminum, the workpiece stack-up comprising at least a first metal workpiece and a second metal workpiece, the first metal workpiece providing a top surface of the workpiece stack-up and the second metal workpiece providing a bottom surface of the workpiece stack-up, wherein a faying interface is established between each pair of adjacent overlapping metal workpieces within the workpiece stack-up, and wherein at least one of the metal workpieces in the workpiece stack-up includes a surface coating;

operating a scanning optic laser head to direct a solid-state laser beam at the top surface of the workpiece stack-up to create a molten weld pool that penetrates into the workpiece stack-up from the top surface towards the bottom surface and to further produce keyhole located within the molten weld pool, the solid-state laser beam having a focal length between 0.4 meters and 2.0 meters; and coordinating the movement of tiltable scanning mirrors within the scanning optic laser head to advance the laser beam relative to a plane of the top surface of the workpiece stack-up and along a beam travel pattern so as to translate the keyhole and the surrounding molten weld pool along a corresponding route relative to the top surface of the workpiece stack-up, the laser beam being advanced from a start point of the beam travel pattern to an end point of the beam travel pattern at a laser beam travel speed that ranges from 8 meters/minute to 100 meters per minute.

14. The method set forth in claim 13, wherein the workpiece stack-up includes only the first and second metal workpieces, or wherein the workpiece stack-up further includes a third metal workpiece disposed between the first and second metal workpieces.

15. The method set forth in claim 13, wherein, during advancement along the beam travel pattern, the solid-state laser beam has a power level ranging from 0.2 kW to 50 kW and a focal point of the solid-state laser beam is positioned between 20 mm below the bottom surface of the workpiece stack-up and 20 mm above the top surface of the workpiece stack-up on a longitudinal axis of the laser beam.

16. The method set forth in claim 13, wherein each of the overlapping metal workpieces in the workpiece stack-up is a steel workpiece that includes a base metal substrate composed of steel, and wherein at least one of the steel workpieces includes a surface coating of zinc, a zinc alloy, or an aluminum-based material.

17. The method set forth in claim 13, wherein each of the overlapping metal workpieces in the workpiece stack-up is an aluminum workpiece that includes a base metal substrate composed of aluminum, and wherein at least one of the aluminum workpieces includes a surface coating of a refractory oxide.

18. The method set forth in claim 13, wherein the solid-state laser beam is a fiber laser beam, a disk laser beam, or a direct diode laser beam.

\* \* \* \* \*